United States Patent [19]

Kojima

[11] 4,325,267
[45] Apr. 20, 1982

[54] BICYCLE CONTROL LEVER DEVICE HAVING CONTROL LEVER MOVEMENT CONFORMING TO A CYCLIST'S FINGERS

[75] Inventor: Masao Kojima, Sakai, Japan
[73] Assignee: Shimano Industrial Company Limited, Osaka, Japan
[21] Appl. No.: 142,379
[22] Filed: Apr. 21, 1980
[30] Foreign Application Priority Data
  May 2, 1979 [JP] Japan .................... 54-59086[U]
[51] Int. Cl.³ .................. G05G 7/00; G05G 5/06
[52] U.S. Cl. ......................... 74/489; 74/475
[58] Field of Search .................. 74/488, 489, 475
[56] References Cited
  U.S. PATENT DOCUMENTS
  2,534,566 12/1950 Yapp .................... 74/489 X
  2,902,882 9/1959 Schwinn ................ 74/489 X
  3,633,437 1/1972 Ishida ................... 74/489

FOREIGN PATENT DOCUMENTS
340315 12/1930 United Kingdom ............... 74/489

Primary Examiner—Allan D. Herrmann
Attorney, Agent, or Firm—Stevens, Davis, Miller & Mosher

[57] ABSTRACT

A control lever device has a lever shaft supported to a fixing member attached in the vicinity of a grip at a handle bar and a control lever having a boss and a control portion supported rotatably to the lever shaft. The lever shaft is slanted with respect to the axis of the handle bar, and the control portion of the control lever is directed toward the grip and positioned radially outwardly of the handle bar with respect to the boss, so that movement of the control portion may match movement of the fingers of a cyclist's hand gripping the handle grip.

5 Claims, 4 Drawing Figures

BICYCLE CONTROL LEVER DEVICE HAVING CONTROL LEVER MOVEMENT CONFORMING TO A CYCLIST'S FINGERS

BACKGROUND AND SUMMARY OF THE INVENTION

This invention relates to a control lever device used mainly for a derailleur at a bicycle, and more particularly to a control lever device in which a lever shaft is supported to a fixing member fixed to a handle bar, and a control lever having a boss and a control portion, is supported rotatably to the lever shaft.

Generally, the control lever device used for controlling a bicycle derailleur is provided in the vicinity of a grip at the handle bar or at the bicycle frame, such as a top tube. The control lever device, when provided in the vicinity of the grip, is adapted to be turned at a lever control portion around the lever shaft by fingers of a cyclist's hand gripping the handle grip.

Conventionally, this kind of control lever device has the lever supported to the lever shaft which is mounted on the handle bar perpendicularly to the axis thereof. Accordingly, the lever, when operated, turns describing a round path around the lever shaft in a horizontal plane parallel to the axis of the handle bar. As a result, the lever control portion moves away from the cyclist's hand, which is gripping the handle bar, as the lever turns more and more. Hence, the cyclist must move his fingers to chase the lever control portion in its circular path of movement. The cyclist, however, cannot move his fingers to fully follow the movement of control portion along the circular path. Hence, the conventional control lever device is poorly designed since a cyclist's fingers cannot always follow movement of the control portion thereby creating a problem in the cyclist's ability to control the lever.

In the light of the aforesaid problem, this invention has been designed. An object of the invention is to provide a control lever device, in which the lever control portion properly follows finger movement of a cyclist's hand for operating the lever providing a cyclist with good control of the lever.

This invention is characterized in that the lever shaft is mounted on the handle bar in a relation of being slanted with respect to the axis of the handle bar, the control portion at the lever is positioned radially outwardly of the handle bar with respect to a boss, and the boss is inserted rotatably onto the slantwise lever shaft.

In detail, the lever shaft is slanted at its utmost end in the direction away from the handle grip, so that the control portion, which is directed toward the grip, is positioned radially outwardly from the handle bar more than the boss with respect to the axis of the handle bar.

The control portion at the lever turns around the lever shaft on a path, in a plan view, approximately parallel to the inward end face of the handle grip, whereby the control portion is turnable to match movement of the fingers of a cyclist's hand gripping the handle grip.

Furthermore, the lever shaft is slanted not only with respect to the axis of the handle bar, but also forwardly of the handle bar with respect to a vertical line intersecting the axis of the handle bar. In other words, the lever shaft is slanted in a two-dimensional direction such that the lever shaft is slanted at its utmost end in the direction away from the handle grip and frontwardly of the handle bar, whereby the control portion is turnable to more fully match finger movement of a cyclist's hand gripping the handle bar.

These and other objects and novel features of the invention will be more apparent from the following description in accordance with the accompanying drawings.

BRIEF DESCRIPTION OF THE DRAWINGS

FIGS. 3 and 4 show a modified embodiment of the invention, in which FIG. 3 is a rear view of the control lever device looking from the rear of the handle bar carrying a brake lever, and FIG. 4 is a side view of the control lever uncovered, looking from the left side.

DETAILED DESCRIPTION OF THE INVENTION

Figure 1:
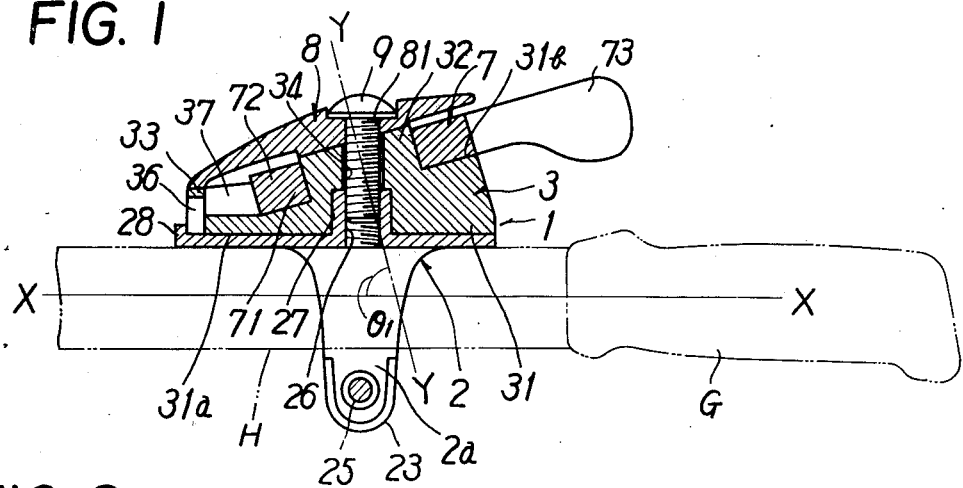
FIG. 1 is a longitudinally sectional view of an embodiment of a control lever device of the invention.

Referring to the drawings, reference numeral 1 generally designates a fixing member, which comprises a tightening band 2 for securing the control lever to a handle bar H, and a supporting member 3.

The tightening band 2 comprises first and second pieces 2a and 2b each of a semicircular shape fit to the handle bar H. The first piece 2a has a horizontal plate 2c having a slot 21 and the second piece 2b has a tongue 22 engageable with the slot 21, the tongue 22 engaging with the slot 21 to connect both the pieces 2a and 2b. The pieces 2a and 2b also have tightening ends 23 and 24 respectively, and a bolt 25 screws with the ends 23 and 24 to tighten them, thereby securing the tightening band 2 onto the handle bar H in the vicinity of the handle grip G.

The horizontal plate 2c at the first piece 2a is provided at the central portion with a tubular mounting shaft 27 which stands upright with respect to the axis X—X of handle bar H and has an intervally threaded bore 26, and at one side edge with a tongue 28 extending vertically.

The supporting member 3 is formed mainly of synthetic resin and comprises a base 31 and a lever shaft 32. The base 31 has a bottom surface 31a parallel to the axis X—X of handle bar, at receiving upper surface 31b slanted at an angle $\theta_1$ with respect to the axis X—X, a projection 33 provided at one side and engageable with the tongue 28 at the first piece 2a to restrain the supporting member 3 from rotating, and a bore 34 provided at the central portion perpendicularly to the bottom surface 31a and extending through the lever shaft 32. The lever shaft 32 projects from the central portion of base 31 perpendicularly with respect to the receiving surface 31b.

The base 31 is placed through its bottom surface 31a on the horizontal plate 2c, the tubular shaft 27 is inserted into the bore 34, and a cover 8 having a through bore 81 and a bolt 9 projecting through the through bore 81 and mounting bore 34 so as to screw with the threaded bore 26, are used to tighten the supporting member 3 to the fixing member 1. In this condition, the lever shaft 32 projecting perpendicularly from the receiving surface 31b is slanted at the axis Y—Y by an angle $\theta_1$ with respect to the axis X—X of handle bar H.

In addition, the lever shaft 32 is slanted at its utmost end in the direction away from the grip G, i.e., leftwardly in FIG. 1. The angle $\theta_1$ is preferable to be about 70 to 75 degrees, in other words, 15 to 20 degrees with respect to a vertical line intersecting the axis X—X of handle bar H. Also, the lever shaft 32 rotatably supports a control lever 7.

Figure 2:
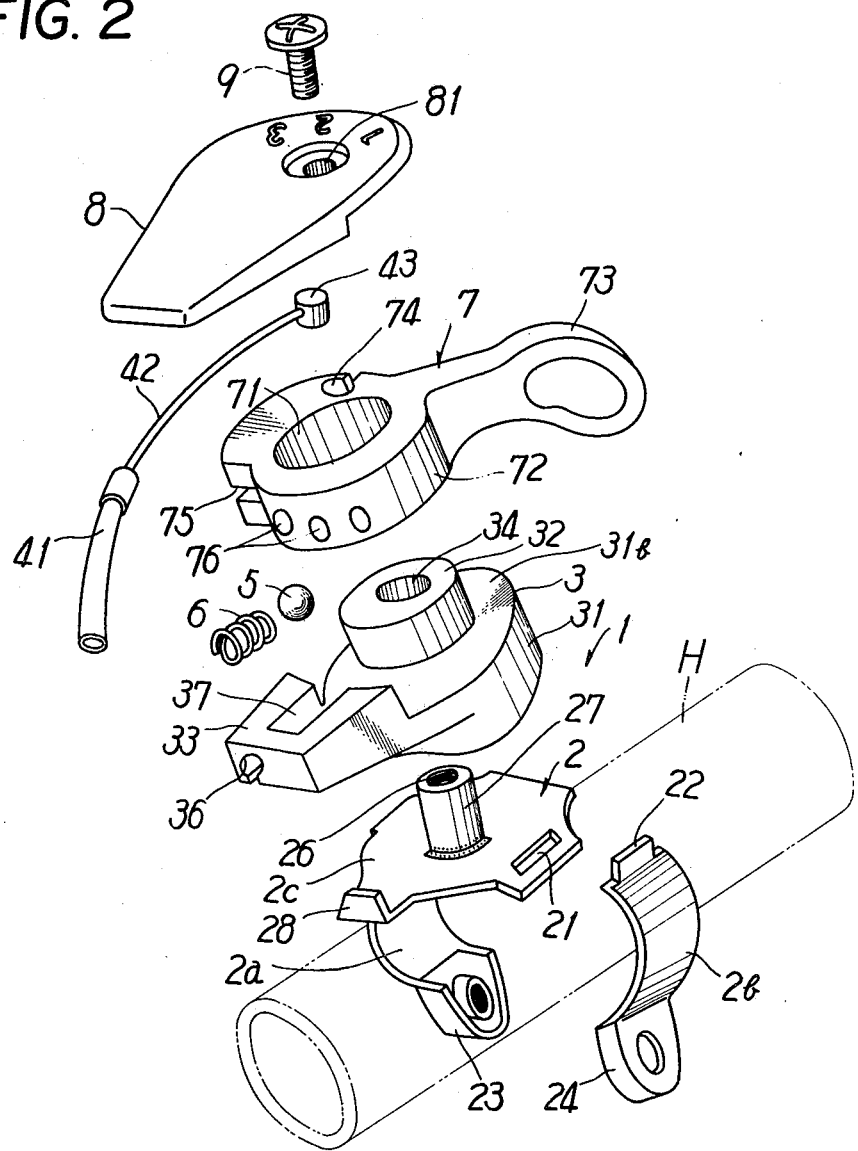
FIG. 2 is a perspective exploded view thereof.

The control lever 7, as seen from FIG. 2, comprises a tubular boss 72 having a central mounting bore 71 and a control portion 73 projecting rearwards from the outer periphery of the boss 72 and integral therewith. The mounting bore 71 is inserted rotatably onto the lever shaft 32, and the boss 72 abuts at its lower surface against the receiving surface 31b at the base 31, thereby mounting the lever 7 on the supporting member 3. The control portion 73, when the lever 7 is mounted, is directed to the grip G and moves above the inward edge of grip G, that is, above the position of a thumb of cyclist's hand gripping the handle grip G. Since the lever 7 is inserted onto the slantwise lever shaft 32 and abuts against the slantwise receiving surface 31b as foregoing, the control portion 73 of lever 7 is kept raidally outwardly of the handle bar H more than the boss 72, that is, upper than the boss 72 with respect to the axis X—X of handle bar H as shown in FIG. 1.

Furthermore, the supporting member 3 is provided at the projection 33 thereof with a retaining bore 36 for an outer cable 41 fixed at its one end to a derailleur and with a chamber 37 housing therein a ball 5 and a spring 6 biasing inwardly the ball 5.

The boss 72 at the lever 7 is provided at the outer peripheral portion with a bore 74, a groove 75, and a plurality of bores 76. The bore 74 retains therein one end piece of an inner wire 42, the groove 75 guiding the wire 42. One of the bores 76 engages with the ball 5, so that the lever 7, when operated, is kept in position for a desired speed-change stage.

Next, function of the aforesaid control lever device will be described.

The lever 7 is turned at its control portion 73 forwardly of the handle bar H by a thumb of cyclist's hand gripping the handle grip G and rearwardly by his forefinger. Since the lever shaft 32 supporting the lever 7 is slanted with respect to the axis X—X of handle bar H as shown in FIG. 1, the control portion 73, when operated forwardly or backwardly by the cyclist's fingers, turns through a round path around the slantwise lever shaft 32, the round path extending across the front end and the rear end of movement of the control portion 73 and in a plane slanted with respect to a horizontal plane parallel to the axis X—X of handle bar H. As a result, the path of movement of control portion 73 can be approximately parallel to the inward end face of grip G in vertical projection.

When the lever shaft is conventionally mounted at a right angle with the axis X—X of handle bar H, the control portion of the lever moves along the path of semicircular arc in a plan view. Hence, the control portion is farthest apart from the grip G at the foremost end and rearmost end, i.e., the starting and end positions of movement of the lever, and nearest the grip G at the medium position.

On the contrary, the control shaft 32 in the present invention, which is slanted as described, moves to describe an arcuate path. The beginning and end of this arcuate path are apart from its medium point at smaller distances in vertical projection than the path of a conventional lever. In other words, the starting and final positions of the turning control portion 73 are apart from the medium position at smaller distances in a plan view in comparison with the convention lever control portion. Hence, the path of movement of control portion 73 of the invention can be approximately parallel to the inward edge of grip G.

Hence, the control portion 73 turns to match the movement of the fingers of cyclist's hand gripping the handle grip, thereby improving the cyclist's fingers to follow ability of the control portion 73 and the controllability of the lever 7.

The present invention, as described above, has the lever shaft 32 and lever 7, slanted only in one direction with respect to the axis of handle bar H. Alternatively, the lever 7 can be slanted in two directions.

Figure 3:
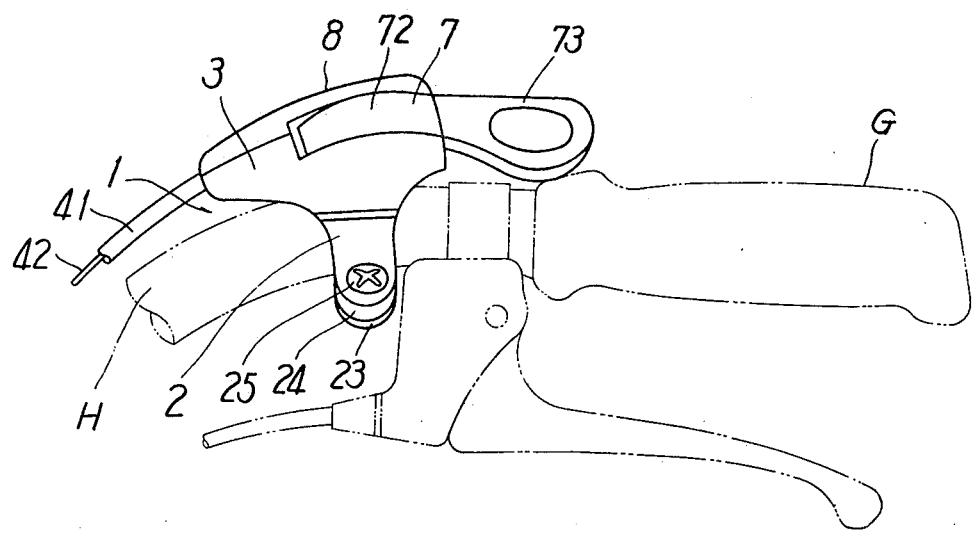
Figure 4:
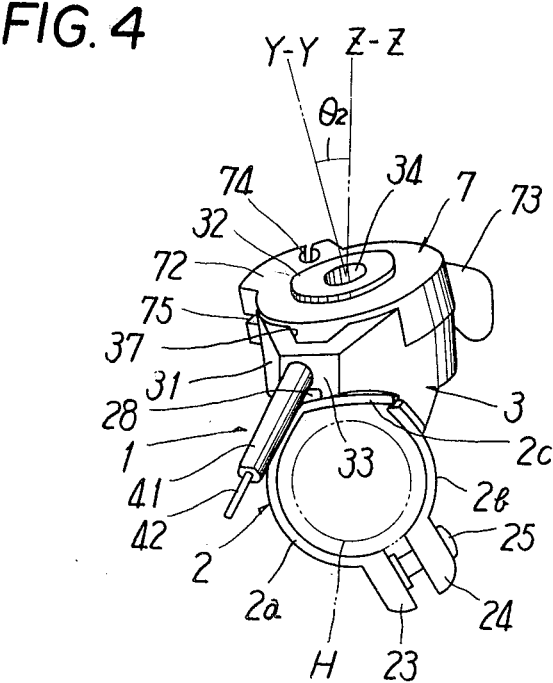

This arrangement is shown in FIGS. 3 and 4. The lever shaft 32 at the supporting member 3, as shown in FIGS. 3 and 4, is slanted at the angle $\theta_1$ with respect to the axis X—X of handle bar H and also forwardly at an angle $\theta_2$ with respect to a vertical line Z—Z (see FIG. 4) extending radially of the handle bar H and intersecting the axis X—X thereof. The lever 7, when inserted rotatably onto the lever shaft 32 slantwise in two directions, is slanted forwardly at the angle $\theta_2$ with respect to the vertical line Z—Z as well as at the angle $\theta_1$ with respect to the axis X—X of handle bar H. In brief, the lever 7 is slanted in the two-dimensional direction such that the lever 7 is slanted forwardly downwardly and the control portion 73 is slanted at the utmost end in the direction away from the axis X—X of handle bar H. The angle $\theta_2$ is about 10 to 15 degrees for proper positioning.

In addition, FIG. 3 shows the brake lever B, which is for clarifying only that the lever 7, which is supported onto the lever shaft 32 slantwise with respect to the vertical line Z—Z intersecting the axis X—X of handle bar H, is slanted with respect to the vertical line Z—Z in contrast with the brake lever B. However, the brake lever B has no relation with the invention.

The two dimensional slanting of control lever 7 enables the control portion 73 to describe a path surrounding the handle bar H radially thereof. Hence, the control portion 73 also better follows the movement of cyclist's fingers gripping the handle grip for operating the lever 7.

As clearly understood from the above description, the control lever device of the invention is of simple construction such that the lever shaft at the fixing member is slanted with respect to the axis of handle bar, and is capable of improving the ability of a cyclist;3 finger to follow the control portion and control the lever.

While a preferred embodiment of the invention has been described using specific terms, such description is for illustrative purpose only, and it is to be understood that changes and variations may be made without departing from the spirit or scope of the invention which is defined by the following claims.

What is claimed is:

1. A control lever device for a bicycle mounted on a handle bar in the vicinity of a grip thereat, said device comprising:

a fixing member attached to said handle bar;

a lever shaft mounted on said fixing member, said lever shaft being slanted at the foremost end thereof in the direction away from said grip with respect to the axis of said handle bar; and a control lever for moving a control wire, said control lever having a boss and a control portion supported rotatably to said lever shaft through said boss, said control portion of said control lever being positioned adjacent to said grip, said control portion being positioned radially outwardly of said handle bar with respect to said boss.

2. A control lever device for a bicycle according to claim 1, wherein said fixing member comprises a tightening band attached to said handle bar and a supporting member fixed to said band, said supporting member having a receiving surface slanted with respect to the axis of said handle bar, and having at said receiving surface a lever shaft extending perpendicularly with respect to said receiving surface.

3. A control lever device for a bicycle according to claims 1 and 2, wherein the angle of inclination of said lever shaft with respect to the axis of said handle bar is 70 to 75 degrees.

4. A control lever device for a bicycle according to claim 1, wherein said lever shaft is slanted with respect to the axis of said handle bar, and also slanted forwardly of said handle bar with respect to a vertical line passing through the axis of said handle bar.

5. A control lever device for a bicycle according to claim 4, wherein the angle of inclination of said lever shaft with respect to a vertical line passing through the axis of said handle bar is 10 to 15 degrees.

* * * * *